United States Patent Office 3,533,939
Patented Oct. 13, 1970

3,533,939
REFORMING WITH A CRYSTALLINE ALUMINO-
SILICATE FREE OF HYDROGENATION ACTIVITY
Harry L. Coonradt, Woodbury, and Winton W. Hamilton,
Westfield, N.J., assignors to Mobil Oil Corporation, a
corporation of New York
No Drawing. Continuation-in-part of application Ser. No.
292,120, July 1, 1963. This application Oct. 12, 1966,
Ser. No. 586,047
Int. Cl. C10g 35/06
U.S. Cl. 208—135                                    24 Claims

ABSTRACT OF THE DISCLOSURE

A process for increasing the aromatic content of a naphtha. The naphtha is contacted with a crystalline aluminosilicate free of hydrogenation activity and the net production of hydrogen is less than about 0.3 weight percent of the naphtha.

This application is a continuation-in-part of application Ser. No. 292,120, filed July 1, 1963, now abandoned.

This invention relates to the catalytic conversion of hydrocarbons, and particularly to an improved reforming process for upgrading low octane naphthas, motor fuels, and the like, to products of more enhanced value. Still more particularly, this invention is directed to the catalytic reforming of hydrocarbon fractions wherein the reforming reaction is effected with a catalyst composition essentially free of hydrogenation activity comprising a crystalline aluminosilicate.

Catalytic reforming processes are well known and have heretofore been employed extensively to improve the octane quality of low-level hydrocarbon fractions boiling in the naphtha or gasoline boiling range. In general, the reforming of hydrocarbons is carried out at elevated temperatures and pressures by contacting the charge stock with a solid catalytic agent containing a hydrogenation-dehydrogenation component, such as platinum, molybdena, chromia, etc., in the presence of hydrogen gas. The reactions which occur in reforming include dehydrogenation of naphthenes to produce aromatics, dehydrocyclization of paraffins and olefins to form aromatics, dehydroisomerization of compounds such as dimethylcyclopentane to form toluene, isomerization of straight chain paraffins to form branch chain isomers, and isomerization of alkyl substituted naphthenes such as ethylcyclopentane to form methylcyclohexane which, in turn, is dehydrogenated to produce toluene. Aside from these reactions, a variety of other reactions also take place such as cracking, polymerization and desulfurization of sulfur bearing compounds to produce hydrogen sulfide and hydrocarbons.

The catalysts heretofore employed for reforming include a wide variety of refractory, inorganic particulate solids which possess both cracking and hydrogenation activity. In general, such catalysts are composed of a heavy metal selected from Groups V, VI, VII, and/or VIII of the Periodic Table disposed upon an inorganic oxide base material such as alumina, silica-alumina, magnesia, zirconia, and the like. One example of a catalyst composition which has been used comprises a small amount of platinum suitably impregnated on activated alumina which may contain a minor amount of chloride or fluoride. Catalysts of this type have been used extensively to increase or upgrade the octane value of straight run or thermal gasoline fractions containing straight chain, slightly branched chain and cyclic paraffins and olefins, most of which have relatively low octane values.

Although various reforming catalysts possess one or more desired characteristics, one of the more important generally recognized disadvantages is their high investment cost. Platinum-containing catalysts, for example, offer the advantage of high octane gasoline with relatively high yields. However, platinum-containing catalysts are readily inactivated with carbonaceous deposits and hence necessitate the use of high partial pressures of hydrogen within the reforming zone in order to prevent the deposition of carbonaceous material which would otherwise deactivate the catalyst. This requires expensive high pressure equipment and expensive equipment for recirculation of hydrogen. Such recirculation necessitates the use of separators for minimizing hydrocarbon diluents, compressors, and equipment for control of hydrogen sulfide, ammonia and/or water level in the hydrogen recycle. A further disadvantage is that the operation is highly endothermic, due primarily to dehydrogenation reactions, which necessitates additional heating devices in the reactor system itself. Platinized-acidic metal oxide reforming catalysts further suffer the disadvantage of being susceptible to poisoning by relatively small amounts of nitrogenous and sulfurous organic compounds which may be present in the charge stock with the result that the charge stock must either be pretreated for removal of trace amounts of impurities or the catalyst frequently regenerated and/or replaced due to the loss of catalytic activity. Catalysts of this type under conditions imposed by thermodynamic equilibrium considerations further require the use of elevated temperatures in order to provide aromatics under the hydrogen partial pressures required. High temperatures, however, tend to increase the production of normally gaseous hydrocarbons by cracking. Moreover, at these high temperatures in the presence of catalysts of this type an unsatisfactory low ratio of iso- to normal-paraffins is obtained and an undesirably high aromatic content is required to obtain the desired octane. This high ratio of aromatics to isoparaffins causes deterioration in quality as measured by various performance indices such as the Rumble Rating. For example, resistance to rumble is generally greater with paraffins than with olefins than with aromatics. Rumble is attributed to multiple surface ignition in the combustion chamber of the engine resulting in high rates of pressure rise causing mechanical vibration of component parts of the engine.

The present invention is based on the discovery that hydrocarbons boiling in the naphtha range can be catalytically reformed by means of a crystalline aluminosilicate catalyst composition essentially free of hydrogenation activity. It has been found that when low octane naphthas, motor fuels and the like, are reformed in the presence of such crystalline aluminosilicate catalysts, a novel combination of reactions is achieved whereby high yields of desired reformate products are obtained. As compared to individual chemical reactions which occur in reforming processes conventionally catalyzed by catalysts with platinum group metals or other hydrogenation components, the use of crystalline aluminosilicates essentially free of hydrogenation activity in accordance with the method of the present invention provides a significant difference in the type and extent of the various chemical reactions. For example, one significant difference is the dehydrogenation of naphthenes to aromatics, which is considered the backbone of conventional reforming processes. Platinum catalysts convert naphthenes to aromatics by dehydrogenation with the liberation of hydrogen as a product, the platinum acting primarily as a dehydrogenation site. In contrast to this, the reforming process of the present invention converts naphthenes to aromatics without liberation of any substantial amount of hydrogen, the conversion to aromatics being achieved by hydrogen transfer and with a catalyst composition comprising an aluminosilicate essentially free of hydrogenation activity. Another significant difference resides in the isomerization of n-paraffins. Branched chain paraffins have considerably higher octane numbers than their corresponding n-isomers and the isomerization of the latter is one of the more important reactions which contribute to increased octane number. In platinum reforming, the isomerization activity is important for the isomerization of cyclopentane derivatives to cyclohexane derivatives which in turn can be dehydrogenated to aromatics. These catalysts are also active for isomerization of paraffins, but at these elevated temperatures an undesirably high ratio of normal- to iso-paraffins is generally obtained as would be expected from thermodynamic considerations. This is evidenced by the low isobutane content of the $C_4$ fraction, it usually being less than about 50%, and the low isopentane content of the $C_5$ fraction, it usually being less than about 70%. In contrast to this, the method of the present invention provides products of very high iso- to normal-ratios, exceeding thermodynamic equilibrium. These and other differences obtained by the method of this invention are especially advantageous for upgrading petroleum stocks. Thus the high iso- to normal-paraffin ratios obtained is a material factor contributing to the production of high octane finished gasolines and represents a departure from the conventional reforming processes. Similarly, the conversion of naphthenes to aromatics by hydrogen transfer rather than dehydrogenation produces a reformate product of reduced aromatic content which can be advantageous as indicated above. The avoidance of the highly endothermic dehydrogenation reaction further eliminates the necessity for additional heating devices in the reactor system. Aside from the above advantages, further advantages are realized inasmuch as the reforming reaction can be carried out in the absence of hydrogen which thus eliminates the need for hydrogen recirculation and expensive high pressure equipment. Additionally, no pretreatment of the feed stock is necessary and the reforming reaction may be carried out in the presence of such impurities as nitrogen and sulfur.

The method of the present invention generally involves the selection of a petroleum naphtha fraction having a boiling point within the range of from about 140° F. to about 425° F. This charge stock is then contacted in a reforming zone with a catalyst composition comprising an aluminosilicate essentially free of hydrogenation activity. By virtue of the catalyst composition the conversion of low octane paraffins to higher value isoparaffins is simultaneously effected with the conversion of naphthenes to aromatics by hydrogen transfer to obtain a reformate product wherein the hydrogen content is essentially the same as that of the charge stock and the net production of hydrogen is less than about 0.3 weight percent based on the charge stock. The reforming reaction may be carried out under mild conditions of temperature and pressure and the entire products, including gaseous materials, processed in conventional low pressure equipment. Thus, the reforming zone may be operated under a pressure of 0.1 to 25 atmospheres absolute at a temperature of about 500° F. to about 1050° F. The normally gaseous products are separated in a gas-liquid separation zone leaving a normally liquid effluent portion from which substantial yields of a select gasoline fraction can be recovered either as a separate stream or with higher boiling fractions.

The catalyst compositions used for purposes of the invention are crystalline aluminosilicates which contain at least 0.5 equivalents and preferably 0.9±0.1 equivalents per gram atom of aluminum of ions of positive valence. Such compositions include a wide variety of natural and synthetic aluminosilicates which may be represented by the formula:

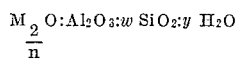

wherein M is an ion of positive valence, $n$ represents the valence of the ion, $w$ is a number representing the average ratio of silica to alumina, and $y$ the moles of water per mole weight of $Al_2O_3$. The ion of positive valence may be any one of a number of ions, including non-metallic ions such as hydrogen ion and ions capable of conversion to hydrogen ions, e.g., ammonium ion. Preferably the metallic cations are those which do not undergo reduction during the reforming process to form a hydrogenation site, e.g., platinum, palladium, and transition group metals such as nickel, cobalt and the like. Typical metal cations include sodium, lithium, potassium, magnesium, calcium, barium, manganese, aluminum and rare earths such as lanthanum, cerium, neodymium, samarium, europium, gadolinium, terbium, dysprosium, holmium, erbium, thulium, ytterbium, lutetium, yttrium, and scandium.

Representative catalysts may be chosen from the known synthesized crystalline aluminosilicates which have been designated as zeolites X, A, Y, L, D, R, S, T, Z, E, F, Q and B.

Other synthesized crystalline aluminosilicates include those designated as ZK–4 and ZK–5.

ZK–4 can be represented in terms of mole ratios of oxides as:

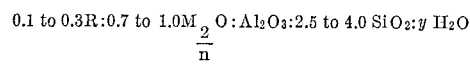

wherein R is a member selected from the group consisting of methylammonium oxide, hydrogen oxide and mixtures thereof with one another, M is a metal cation having a valence of $n$, and $y$ is any value from about 3.5 to 5.5.

ZK–5 can be represented in terms of mole ratios of oxides as:

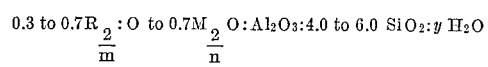

wherein R is selected from the group consisting of a nitrogen-containing cation derived from N,N' - dimethyltriethylene diammonium ion and mixtures of said cation with hydrogen and $m$ is the valence thereof; M is a metal and $n$ the valence thereof and $y$ is any value from 6 to about 10.

Among the naturally occurring crystalline aluminosilicates which can be employed for purposes of the invention are included faujasite, heulandite, clinoptilolite, chabazite, gmelinite, mordenite, dachiardite, and erionite.

Other aluminosilicates which can be used are derived from teating clays.

Of the clay materials, montmorillonite and kaolin families are representative types which include the sub-bentonites, such as bentonite, and the kaolins commonly identified as Dixie, McNamee, Georgia, and Florida clays in which the main mineral constituent is halloysite, kaolinite, dickite, nacrite, or anauxite. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment with caustic can be effected by reacting mixtures falling within the following weight ratios:

$Na_2O$/clay (dry basis)—1.0–6.6 to 1
$SiO_2$/clay (dry basis)—0.01–3.7 to 1
$H_2O$/$Na_2O$ (mole ratio)—35–180 to 1

The aluminosilicate catalyst compositions may be used alone or in combination with each other. Particularly preferred aluminosilicates are the natural and synthetic materials which have a pore size sufficiently large to admit representative molecules of the reformer charge such as zeolite L, faujasite, e.g., zeolites X and Y, and the like. Such materials can have a pore size greater than about 6 angstrom units. Aluminosilicates of about 5 to 6 angstrom units pore size such as chabazite, gmelinite, erionite (offretite), zeolites A, T, ZK-4 and ZK-5, will not admit the larger reformer charge molecules and are desirably used in conjunction with aluminosilicates of larger pore size.

Extensive testing of a large variety of aluminosilicates had indicated that while they vary in their activity, most crystalline aluminosilicates possess catalytic activity and are useful for purposes of the invention. The aluminosilicates of most intense, yet controllable and therefore optimum, catalytic activity, are those having a silica to alumina ratio of at least 3.0, preferably 5.0 or higher, and which contain hydrogen ions, rare earth ions or mixtures thereof. Among the preferred types of aluminosilicates of which specific representative compositions have been tested and shown to be active are those represented by the formula:

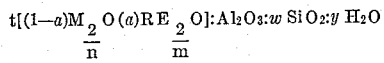

wherein $t$ is a number within the range of 0.5 to 1.0, $a$ is a number including fractions, between 0 and 1, RE are cations of at least one rare earth metal and $m$ the valence thereof, $w$ is a number of 3.0 or greater, $y$ is a number representing the moles of water ranging from 0 up to about 10, and M represents a hydrogen ion, an ion capable of conversion thereto, e.g., ammonium, etc., or a metallic cation of at least one metal other than a rare earth metal having a valence of $n$.

Within the scope of the above formula, a preferred embodiment is directed to acid aluminosilicates, e.g., where $t$ ranges from 0.8 to 1.0, $a$ is equal to zero (0), M is hydrogen, and $w$ is a number of at least 3.0 and preferably a number of 5.0 or higher. Another preferred embodiment is directed to aluminosilicates which contain hydrogen ions and rare earth ions, e.g., where $t$ ranges from 0.8 to 1.0, $a$ is equal to at least 0.5, M is hydrogen, and RE are cations of at least one rare earth metal. The rare earth cations can be cations of a single rare earth metal or can be mixtures of rare earth cations. The preferred rare earth cations are those of lanthanum, cerium, neodymium, praseodymium, samarium, and gadolinium, as well as mixtures of rare earth cations containing a predominant amount of one or more of the above cations. Still another preferred embodiment is directed to rare earth, or rare earth-metal aluminosilicates, wherein $a$ is equal to a number ranging from 0.5 to 1.0, M represents a metal cation other than rare earth, preferably a divalent cation, and RE are cations of rare earths as above described.

Variation in the cationic form of the aluminosilicate, including preparation of the preferred class of catalyst compositions, is achieved by treating a precursor aluminosilicate with an aqueous medium containing a source of hydrogen ions, hydrogen ion precursors, e.g., ammonium chloride, tetramethylammonium hydroxide, etc., or a metallic salt of the desired metal cation. The only limitation on the use of metal salts or mixtures of salts is that it be effectively soluble in the fluid medium to provide ion transfer; that it be compatible with the hydrogen ion source, particularly if both metallic ion and hydrogen ion are used in the same fluid medium, and that the resulting ionic form of the aluminosilicate be a stable crystalline aluminosilicate. The pH value of the fluid medium will vary within wide limits depending upon the precursor aluminosilicate and its silica to alumina ratio. Where the aluminosilicate precursor material has a molar ratio of silica to alumina greater than about 4.0, the fluid medium may contain a hydrogen ion, metal cation, ammonium ion, or a mixture thereof, equivalent to a pH value ranging from less than 1.0 up to a pH value of about 12.0 Within these limits, pH values for fluid media containing a metallic cation and/or an ammonium ion range from 4.0 to 12.0, and are preferably between a pH value of 4.5 to 8.5. For fluid media containing a hydrogen ion either alone or with a metallic cation, the pH values range from less than 1.0 up to about 7.0, and is preferably within the range of less than 1.0 up to 4.5 Where the silica to alumina ratio is less than about 4.0, the pH value for the fluid media containing a hydrogen ion or a metal cation ranges from 3.8 to 8.5. Where ammonium ions are employed, either alone or in combination with metallic cations, the pH value ranges from 4.5 to 9.5 and is preferably within the limit of 4.5 to 8.5 When the alumino silicate material has a molar ratio of silica to alumina less than about 3.0 the preferred medium is a fluid medium containing an ammonium ion instead of a hydrogen ion.

In carrying out the treatment with the fluid medium, the procedure comprises contacting any of the above-noted natural or synthetic aluminosilicates with the desired fluid medium or media until such time as cations originally present in the aluminosilicate are replaced with the desired metal ion, hydrogen ion or mixtures thereof. The exchange is preferably carried out to the extent that the alkali metal content of the crystalline aluminosilicate is reduced to less than about 0.25 equivalent per gram atom of aluminum, and preferably less than 0.15 equivalence per gram atom of aluminum. Effective treatment with the fluid medium to obtain an aluminosilicate having high catalytic activity will vary with the duration of the treatment and temperature at which it is carried out. Such treatments are also governed by equilibrium considerations. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 4 and 8, and is essentially free of cations. The resulting product is thereafter dried to remove the liquid water phase and preferably activated by heating at temperatures ranging from 400° F. to 1500° F.

The aluminosilicate compositions may be analyzed for metallic ion content by methods well known in the art. Analysis may also be made by analyzing the effluent wash for cations.

The actual procedure employed for carrying out the fluid treatment of the aluminosilicate may be accomplished in the batchwise or continuous method under atmospheric, subatmospheric, or superatmospheric pressure. A solution of the ions in the form of a molten material, vapor, aqueous or non-aqueous solution, may be passed slowly through a fixed bed of the aluminosilicate precursor material. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the acid or ammonium compound is below the decomposition temperature of the particular aluminosilicate employed.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NSO_3H$), amidodisulfonic acid

[$NH(SO_3H)_2$]

chlorosulfuric acid, thiocyanic acid, hyposulfurous acid ($H_2S_3O_4$), pyrosulfuric acid ($H_2S_2O_7$), thiosulfuric acid ($H_2S_2O_3$), nitrosulfonic acid ($HSO_3NO$), hydroxylamine disulfonic acid [$(HSO_3)_2NOH$], nitric acid, nitrous acid, hyponitrous acid, carbonic acid, phosphorus acid, phosphoric acid and the like.

Typical organic acids which find utility in the practice of the invention can include monocarboxylic, dicarboxylic and polycarboxylic acids which can be aliphatic, aromatic or cycloaliphatic in nature.

Still other classes of compounds which can be employed are ammonium compounds or substituted ammonium compounds, amines, amine complexes and phosphorus analogs thereof which can be decomposed or oxidized to provide hydrogen ions when an aluminosilicate treated with a solution of said compound is subjected to temperatures below the decomposition temperature of the particular aluminosilicate.

Representative ammonium compounds which can be employed include ammonium chloride, ammonium bromide, ammonium iodide, ammonium hydroxide, ammonium bicarbonate, ammonium sulfate, ammonium peroxysulfate, ammonium acetate, ammonium tungstate, ammonium hydroxide, ammonium molybdate, ammonium sesquicarbonate, ammonium chloroplumbate, ammonium citrate, ammonium dithionate, ammonium fluoride, ammonium gallate, ammonium nitrate, ammonium formate, ammonium propionate, ammonium butyrate, ammonium valerate, ammonium lactate, ammonium malonate, ammonium oxalate, ammonium palmitate, ammonium tartarate, and the like. Still other ammonium compounds which can be employed include tetraalkyl and tetraaryl ammonium salts such as tetramethylammonium hydroxide, and trimethylammonium hydroxide. Other compounds which can be employed are nitrogen bases such as guanidine, pyridine, quinoline, etc., and strongly basic water soluble amines such as hydrazine, methylamine, ethylenediamine, and the like.

A wide variety of metallic compounds can be employed with facility as a source of metallic cations, including both inorganic and organic salts of various metals. Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartarates, and the like. The preferred salts are the chlorides, nitrates, acetates and sulfates.

When metallic salts are employed, the preferred salts are those of trivalent metals, then of divalent metals and lastly, of monovalent metals. Of the divalent metals, the preferred materials are of Group II-A of the Periodic Table. The preferred trivalent salts are those of the rare earth metals which include aluminum cerium, lanthanum, praseodymium, neodymium, samarium, europium, galolinium, terbium, dysprosium, holmium, erbium, thulium, ytterbium, lutetium, yttrium, and scandium.

The rare earth salts employed can either be the salt of a single metal or preferably of mixtures of metals such as rare earth chlorides or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium, and yttrium. Rare earth chlorides are commercially available and a representative mixture contains the chlorides of a rare earth mixture having the approximate relative composition: cerium (as $CeO_2$) 48% by weight, lanthanum (as $La_2O_3$) 24% by weight, praseodymium (as $Pr_6O_{11}$) 6% by weight, neodymium (as $Nd_2O_3$) 19% by weight, samarium (as $Sm_2O_3$) 2% by weight, gadolinium (as $Gd_2O_3$) 0.7% by weight, others plus yttrium (as $R_2O_3$) 0.2% by weight. Didymium chloride is also a mixture of rare earth chlorides, but having a low cerium content. A representative mixture consists approximately of the following rare earths determined as oxides: lanthanum, 46% by weight; cerium, 1% by weight; praseodymium, 10% by weight; neodymium, 32% by weight; samarium, 6% by weight; gadolinium, 3% by weight; yttrium, 0.4% by weight; other rare earths 1% by weight. It is to be understood that other mixtures of rare earths are equally applicable in the instant invention.

Representative metal compounds which can be employed, aside from the mixtures mentioned above, include silver sulfate, silver nitrate, silver acetate, silver perchlorate, silver ferricyanide, calcium acetate, calcium bromide, calcium chloride, calcium citrate, beryllium bromide, beryllium carbonate, beryllium hydroxide, beryllium sulfate, barium acetate, barium bromide, barium chloride, barium hydroxide, manganous acetate, magnesium bromide, magnesium sulfate, magnesium acetate, magnesium citrate, zinc sulfate, zinc nitrate, zinc acetate, zinc chloride, zinc bromide, aluminum chloride, aluminum bromide, aluminum acetate, aluminum citrate, aluminum nitrate, aluminum hydroxide, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous sulfate, cerous acetate, cerous bromide, cerous carbonate, cerous chloride, cerous iodide, cerous sulfate, lanthanum chloride, lanthanum bromide, lanthanum nitrate, lanthanum sulfate, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, etc.

Although reference has been made to reforming with catalyst compositions comprising crystalline aluminosilicates, it is to be understood that other crystalline materials which have an analogous structure to the aluminosilicate likewise can be employed. Such materials include, for example, gallosilicates, aluminogermanates, and gallogermanates.

Mixtures of aluminosilicates having different pore sizes and/or activities also are contemplated.

The aluminosilicate catalyst prepared in the foregoing manner may be used as a catalyst per se or as intermediates in the preparation of further modified contact masses consisting of a porous matrix and the aluminosilicate. The catalyst may be used in powdered, granular or molded state formed into spheres or pellets of finely divided particles having a particle size of 500 mesh or larger. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 400° to 1500° F. for periods of time ranging from 1 to 48 hours or more.

The term "porous matrix" includes organic and/or inorganic compositions with which the aluminosilicate can be combined, dispersed or otherwise intimately admixed wherein the matrix may be active or inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregate, pumice, firebrick, diatomaceous earths, activated charcoal, refractory oxides, and the like.

Another embodiment of the invention is the use of finely divided aluminosilicate catalyst particles in a porous matrix consisting of an inorganic oxide gel wherein the catalyst is present in such proportions that the resulting product contains about 2 to 95% by weight, preferably about 5 to 50% by weight, of the aluminosilicate in the final composite.

The aluminosilicate-porous matrix compositions can be prepared by several methods wherein the aluminosilicate is reduced to a particle size less than 40 microns, preferably within the range of less than 1 to 10 microns, and intimately admixed with an inorganic oxide gel while the latter is in the hydrous state such as in the form of a hydrosol, hydrogel, wet gelatinous precipitate or a mixture thereof. Thus, finely divided active aluminosilicate can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. 2,384,946. The aluminosilicate-inorganic oxide gel thus obtained is washed free of soluble salts and thereafter dried and/or calcined as desired. The total alkali metal content of the resulting composite, including alkali metals which may be present in the aluminosilicate as an impurity, is less than about 4 percent and preferably less than about 3 percent by weight based on the total composition. If an inorganic oxide gel matrix is employed having too high an alkali metal content, the alkali metal content can be reduced by treating with a fluid media previously set forth either before or after drying.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide, which, upon drying, is converted to alumina. The aluminosilicate may be incorporated with the aluminiferous oxide while the latter is in the form of hydrosol, hydrogel or wet gelatinous precipitate or hydrous oxide.

The porous matrix may also consist of a semi-plastic or plastic clay material. The aluminosilicate can be incorporated into the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc. These clays are advantageously used in combination with alkali metal aluminosilicates inasmuch as the clay material provides a sink for irreversible removal of alkali metal into the clay component of the composite. Thus when an alkali metal crystalline aluminosilicate is admixed with a clay matrix and thermally interacted in the presence of steam, the alkali metal migrates irreversibly into the clay matrix and becomes insoluble. In this manner a clay matrix thus permits the use of an otherwise unstable alkali metal aluminosilicate.

The porous matrix may also consist of a plural gel comprising a predominant amount of silica with one or more metal oxides thereof selected from Groups I–B, II, III, IV, V, VI, VII and VIII of the Periodic Table. Particular preference is given to the plural gels or silica with metal oxides of Groups II–A, III and IV–A of the Periodic Table, especially wherein the metal oxide is magnesia, alumina, zirconia, titania, beryllia, thoria or a combination thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, lead, calcium, magnesium, barium, lithium and their compounds as well as silica, alumina, silica-alumina, or other siliceous oxide combinations as fines in amounts ranging from 0.5 to 40 percent by weight based on the finished catalyst.

Other preferred matrices include powdered metals, such as aluminum, stainless steel, and powders of refractory oxides, such as alumina, etc., having very low internal pore volume. These materials have substantially no inherent catalytic activity of their own.

As a further embodiment of the invention, aluminosilicate catalysts having exceptionally high orders of activity can be prepared by incorporating a metal aluminosilicate in a porous matrix such as silica-alumina, for example, and thereafter contacting the aluminosilicate with the above-described fluid medium containing the hydrogen ion, hydrogen ion precursor or desired metal cation. The treatment is carried out for a sufficient period of time under conditions previously described for obtaining active aluminosilicates.

It has been further found in accordance with the invention that catalysts of improved selectivity and having other beneficial properties are obtained by subjecting the catalyst composition to a mild steam treatment carried out at elevated temperatures of 800° F. to 1500° F. and preferably at temperatures of about 1000° F. to 1400° F. for a period of time ranging from 1 to 48 hours or more. The treatment may be accomplished in an atmosphere of 100 percent steam or in an atmosphere consisting of steam and a gas which is substantially inert to the aluminosilicate. The steam treatment apparently provides beneficial properties in the aluminosilicate compositions and can be conducted before, after or in place of the calcination treatment.

An alternate steam or hydrothermal treatment can be accomplished at lower temperatures and elevated pressures, e.g., 350–700° F. at 10 to about 200 atmospheres.

The catalyst compositions prepared in the foregoing manner may be used in a wide variety of catalytic reforming operations designed for upgrading a hydrocarbon fraction falling within the gasoline range. The charge stocks which may be reformed include wide boiling straight run naphthas, light straight run naphthas, heavy straight run naphthas, catalytically cracked naphthas, thermally cracked naphthas, thermally reformed naphthas, coker naphthas, and the like. The preferred charge stocks consist essentially of naphthas having an initial boiling point within the range of from about 140° F. to about 350° F. and an end boiling point within the range of from about 250° F. to about 425° F. Included within this range are selected fractions thereof such as, for example, a heavy Mid-Continent naphtha having a boiling range of from about 250° F. to about 425° F. Mixtures of various gasolines and/or gasoline fractions also may be used.

If desired, a diluent such as nitrogen, hydrogen, steam, carbon dioxide, hydrogen sulfite, etc., may be admixed with the feed material.

The catalyst compositions may be used in such reforming processes which employ a fixed bed of catalyst, a moving bed of catalyst, a fluidized catalyst, or any combination thereof. In a preferred operation, the reforming process is carried out by contacting the hydrocarbon fraction at a temperature within the range of from about 500° F. to about 1050° F., and preferably within the range of 600° F. to 850° F., and a pressure in the range of 0.1 to about 25 atmospheres absolute, and preferably about atmospheric pressure. The liquid hourly space velocity, i.e., liquid volume of hydrocarbon per volume of catalyst, is between 0.05 and 40, and preferably between about 0.2 and 10.

Regeneration of the catalyst may be accomplished by burning carbonaceous deposits therefrom with air or other oxygen-containing gas at temperatures less than about 1200° F., and preferably between 700° F. and 1200° F.

The following catalysts represent those adapted for use in the present invention.

EXAMPLE 1

A synthetic crystalline aluminosilicate identified as zeolite Y was treated with a 5% by weight aqueous ammonium chloride solution 12 times, each time being for a period of 2 hours. The resulting product was washed with water until the effluent wash contained no chloride ions, dried and then treated with steam under atmospheric pressure for 88 hours at 1225° F. followed by 10 hours at 1200° F. under a pressure of 15 p.s.i.g. The resulting product analyzed 0.13 weight percent sodium.

EXAMPLE 2

Mordenite, a naturally occurring aluminosilicate, was ground to a particle size of about 5 microns. Five cubic centimeters of this material was subjected to 3 treatments at 180° F. with 10 milliliters of a 25% by weight aqueous solution of ammonium chloride for periods of time of 4, 24 and 28 hours, respectively. The ammonium chloride solution was decanted and the aluminosilicate was washed with three 15 milliliter portions of water, dried overnight at 240° F., and then calcined for 15 minutes in air at 1000° F. The final product, after being washed, dried and calcined, analyzed 0.30 weight percent sodium.

EXAMPLE 3

A synthetic crystalline aluminosilicate identified as zeolite 13X was subjected to 12 two-hour treatments at 180° F. with an aqueous solution containing 5% by weight mixture of rare earth chloride hexahydrate and 2% by weight of ammonium chloride. The aluminosilicate was then washed with water until there were no chloride ions in the effluent, dried, and then treated for 20 hours at 1225° F. with 100% atmospheric steam to yield a catalyst having a sodium content of 0.31 weight percent and a rare earth content, determined as rare earth oxides, of 24.8 weight percent.

EXAMPLE 4

The procedure of Example 3 was repeated with the exception that 1% by weight of the rare earth chloride and 5% by weight ammonium chloride were used. Treatment with the solution was carried out in a continuous manner. The catalyst analyzed 0.72 weight percent sodium and 19.0 weight percent rare earth, determined as rare earth oxide.

EXAMPLE 5

A synthetic crystalline aluminosilicate identified as zeolite 13X was subjected to a continuous treatment with an aqueous solution consisting of 5% by weight of lanthanum chloride hexahydrate and 2% by weight of ammonium chloride at 180° F. The aluminosilicate was then washed with water until there were no chloride ions in the effluent, dried and then treated for 20 hours at 1225° F. with 100% atmospheric steam to yield a catalyst having a sodium content of 0.36 weight percent and a lanthanum content of 26.2 weight percent.

EXAMPLE 6

The procedure of Example 5 was repeated with the exception that 5% by weight rare earth chloride hexahydrate was employed. The catalyst analyzed 0.27 weight percent sodium and 27.5 weight percent rare earth, determined as rare earth oxide.

EXAMPLE 7

A synthetic crystalline aluminosilicate identified as zeolite 13X was treated continuously with an aqueous solution consisting of 5% by weight mixture of rare earth chloride hexahydrate and 5% by weight of ammonium chloride. The product was washed with water until the effluent contained no chloride ions, dried and then treated for 20 hours with steam at 1225° F. under atmospheric pressure. The resulting alumino-silicate contained 0.36 weight percent sodium and 24.6 percent by weight rare earth, determined as rare earth oxide.

EXAMPLE 8

The procedure of Example 7 was repeated with the exception that the solution consisted of 5% by weight of calcium chloride and 2% by weight of ammonium chloride. The procedure was carried out batchwise with 18 treatments at 180° F., each treatment being for two hours. The catalyst analyzed 0.2 weight percent sodium and 9.6 weight percent calcium.

EXAMPLE 9

Dixie clay,[1] an aluminosilicate which had been caustic treated, was treated with an aqueous solution consisting of 5% by weight mixture of rare earth chloride hexahydrate and 2% by weight of ammonium chloride. The treatment was carried out continuously at 180° F. The aluminosilicate was then washed with water until the effluent contained no chloride ions, dried and treated with steam for 20 hours at 1225° F. at atmospheric pressure. The product analyzed 0.53% by weight sodium and 24.1% by weight rare earth determined as rare earth oxide.

EXAMPLE 10

10 parts by weight of a crystalline aluminosilicate identified as zeolite Y was dispersed into 90 parts by weight of a silica-alumina matrix and the resulting composition was treated for 16 continuous hours with an aqueous solution comprising a 2% by weight mixture of rare earth chloride hexahydrate and then for 24 continuous hours with a 1% by weight aqueous ammonium chloride solution. The aluminosilicate was then washed with water until the effluent contained no chloride ions, dried and then treated for 24 hours at 1200° F. with steam at 15 p.s.i.g. to yield a catalyst having a rare earth content of 3.35 weight percent.

EXAMPLE 11

The procedure of Example 10 was repeated with the exception that one 16 hour batch treatment with 2% by weight aqueous solution of lanthanum chloride hexahydrate followed by one 24 hour continuous exchange with 1% by weight ammonium chloride was employed at room temperature. The resulting catalyst, after being steamed at 1200° F. at 15 p.s.i.g. for 48 hours, had a lanthanum content of 5.14 weight percent, determined as lanthanum oxide, and a sodium content of 0.21 weight percent.

EXAMPLE 12

A crystalline synthetic aluminosilicate identified as zeolite Y and having a molar ratio of silica to alumina greater than about 4, was treated continuously at 180° F.

---

[1] 44.51 wt. percent $Al_2O_3$, 38.51 wt. percent $SiO_2$, 1.27 wt. percent $Fe_2O_3$, 1.45 wt. percent $TiO_2$, 0.08 wt. percent $CaO$, 0.12 wt. percent $MgO$, 0.08 wt. percent $Na_2O$.

with an aqueous solution containing 5% by weight rare earth chloride hexahydrate and 2% by weight ammonium chloride. The resulting product, after being washed, dried and calcined, was treated for 24 hours with steam at 1200° F. under a pressure of 15 p.s.i.g. The final product analyzed 1.32% by weight sodium and 15.2% by weight rare earth determined as rare earth oxide.

EXAMPLE 13

A synthetic crystalline aluminosilicate identified as zeolite 13X was subject to 32 two-hour contacts at 180° F. with a 5% by weight solution of didymium chloride hexahydrate. After washing, drying and calcining, the resulting product analyzed 0.53% by weight sodium.

EXAMPLE 14

The procedure of Example 13 was repeated and the resulting product was subjected to steam for 30 hours at 1200° F. under a pressure of 15 p.s.i.g.

EXAMPLE 15

A synthetic crystalline aluminosilicate identified as zeolite Y was subject to 12 two-hour contacts at 180° F. with a 5% by weight aqueous solution of rare earth chloride hexahydrate. The resulting product was washed free of chloride and dried. The product analyzed 1.13% by weight sodium and 20.9% by weight rare earth determined as rare earth oxides.

EXAMPLE 16

The procedure of Example 15 was repeated and the resulting product was treated with steam at 1225° F. for 20 hours under atmospheric pressure.

EXAMPLE 17

A synthetic crystalline aluminosilicate identified as zeolite 13X was treated with a 5% by weight solution of rare earth chloride hexahydrate consisting mainly of the chlorides of lanthanum, praseodymium, neodymium, and cerium. The resulting product, after being washed and dried, was treated for 20 hours at 1225° F. with 100% steam at atmospheric pressure. The product analyzed 0.5% by weight sodium and 27.4% by weight rare earth determined as rare earth oxides.

EXAMPLE 18

A synthetic crystalline aluminosilicate identified as zeolite 13X was treated with a 5% by weight aqueous solution of cerous chloride. The resulting product, after being washed and dried, analyzed 1.1% by weight sodium and 23.8% by weight cerium. The catalyst was steamed for 10 hours at 1200° F. at 15 p.s.i.g.

EXAMPLE 19

A crystalline sodium aluminosilicate was prepared from the following solutions:

Solution A—7% aqueous sodium hydroxide solution

| | Lbs. |
|---|---|
| Sodium hydroxide (NaOH) pellets (containing 75.5 weight percent $Na_2O$) | 22 |
| Water | 286 |
| | 308 |

Specific gravity of solution 1.077 at 68° F.

Solution B—Sodium silicate solution

| | Lbs. |
|---|---|
| Solution A (7% NaOH) | 154 |
| Sodium silicate (containing 8.8% $Na_2O$, 28.5% $SiO_2$, 62.7% $H_2O$ and having a specific gravity at 60° F. of 1.392) | 77.5 |
| | 231.5 |

Specific gravity of solution 1.172 at 68° F.

Solution C—Sodium aluminate solution

| | Lbs. |
|---|---|
| Solution A (7% NaOH) | 154 |
| Water | 51.6 |
| Sodium aluminate powder (containing 43.5% $Al_2O_3$ and 30.2% $Na_2O$) | 25.6 |
| | 231.2 |

Specific gravity of solution 1.130 at 68° F.

Solution C was poured into solution B with vigorous agitation at room temperature. Lumps of gel formed which were broken by vigorous mixing. The entire mass was mixed thoroughly to a cream-like consistency. Such mixture was placed in containers of about 5 gallons capacity each. These containers were introduced into a water bath and allowed to stand at 205° F. therein for 17 hours without agitation. At the end of this period, there was found to have formed in the containers a flocculent precipitate beneath a clear supernatant liquid. The containers were then removed from the bath. The precipitate was filtered and washed with water at room temperature until the pH of the filtrate was below 11.5. The resulting alumino-silicate crystalline product was dried in air at a temperature of approximately 250° F. and upon analysis was found to have a sodium content of 14.4 weight percent.

One-half (0.5) pound of the above crystalline sodium aluminosilicate was contacted at a temperature of 150° F. with 750 cc. of an aqueous solution containing 0.25 pound of beryllium chloride and 0.25 pound of rare earth chloride hexahydrate mixture having the composition:

| | Wt. (percent) |
|---|---|
| Cerium (as $CeO_2$) | 20 |
| Lanthanum (as $La_2O_3$) | 11 |
| Praseodymium (as $Pr_6O_{11}$) | 3 |
| Neodymium (as $Nd_2O_3$) | 9 |
| Samarium (as $Sm_2O_3$) | 1 |
| Gadolinium (as $Gd_2O_3$) | 0.3 |
| Other rare earths | 0.1 |

Nitrogen was bubbled through the mixtures to provide continuous agitation. Every 24–48 hours, the solid was filtered, washed and contacted with a fresh solution of the beryllium chloride and rare earth metal chloride. Exchange was carried out for a period of 60 days, at which time the product was found to contain, on a dry basis, 1.23 weight percent sodium, 6.3 weight percent beryllium, 2.9 weight percent cerium, together with substantial quantities of lanthanum, praseodymium, neodymium, and samarium. The product obtained was filtered, washed, dried and pelleted to ⅛ x ¹⁄₁₆″ particles. The particles, upon being subject to crystallinity analysis, were found to contain a substantial amount of crystallinity.

EXAMPLE 20

A crystalline sodium aluminosilicate was prepared as in Example 19 and was incorporated in a silica-alumina gel matrix consisting of about 94% by weight $SiO_2$ and 6% by weight $Al_2O_3$ in the following manner.

A hydrogel was prepared by admixture of the following solutions:

(A) Sodium silicate solution 42.6 wt. percent sodium silicate ($Na_2O/SiO_2$=0.3/1.)
53.1 wt. percent water
4.3 wt. percent sodium aluminosilicate powder containing 55% solids at 230° F.

(B) Acid solution 93.34 wt. percent water
3.43 wt. percent aluminum sulfate

Solution A having a specific gravity of 1.191 at 76° F. and solution B having a specific gravity of 1.059 at 79° F.

were continuously mixed together through a mixing nozzle using 398 cc. per minute of the silicate solution at 58° F. and 320 cc. per minute of the acid solution at 40° F. The resulting hydrosol, containing 25 percent by weight dispersed crystalline sodium aluminosilicate powder, on a finished catalyst basis, was formed into hydrogel beads at 63° F. with a gelatin time of 1.7 seconds at a pH of 8.5.

The resulting hydrogel beads were base exchanged with a 2% by weight aqueous solution of rare earth chloride derived from monoazite sand and containing cerium chloride, along with the chlorides of praseodymium, lanthanum, neodymium, and samarium. Base exchange was completed using nine 2-hour contacts and three overnight contacts of approximately 18 hours each. The finished catalyst product, upon analysis, showed a sodium content of less than 0.5 weight percent and a total rare earth oxide content of about 15 weight percent (primarily lanthanum and neodymium, with some samarium and cerium).

EXAMPLE 21

The catalyst of this example was prepared in a manner analogous to that of Example 20 with the exception that the aqueous solution contained 4 percent by weight calcium chloride and 1 percent by weight of a mixture of rare earth chloride hexahydrate. The final catalyst product, after being treated with steam for 20 hours at 1225° F., was found to contain 2.64 weight percent calcium, 8.33 weight percent rare earth (determined as rare earth oxide) and 0.16 weight percent sodium.

EXAMPLE 22

A synthetic crystalline aluminosilicate identified as zeolite 13X was treated continuously at 180° F. with a 5% by weight aqueous solution of a mixture of rare earth chloride hexahydrate. The resulting product, after being washed and dried, was treated with steam for 24 hours at 1200° F. under a pressure of 15 p.s.i.g.

The product analyzed 0.57% by weight sodium and 26.4% by weight rare earth determined as rare earth oxides.

EXAMPLE 23

A synthetic crystalline aluminosilicate identified as zeolite 13X was treated at 180° F. with an aqueous solution consisting of 5% by weight rare earth chloride hexahydrate and 2% by weight ammonium chloride. The product was washed free of chloride ion, dried, and then treated for 20 hours with steam at 1225° F. under atmospheric pressure. The resulting aluminosilicate contained 0.24 weight percent sodium and 25.2 weight percent rare earth, determined as rare earth oxide.

A feed stock having the following characteristics as shown below in Table I was employed for evaluation.

TABLE I

Feed designation—A
Gravity, ° API—51.4
ASTM, distillation, ° F.
  I.B.P.—278
  10—293
  30—302
  50—310
  70—321
  90—339
  E.P.—369
Octane No. R+3—59.5
Hydrogen, wt. percent—14.1
Paraffins, vol. percent—46.3
Naphthenes, vol. percent—42.3
Aromatics, vol. percent—10.4

The types and extent of chemical reactions which occur in the reforming process of the present invention differ markedly from catalytic processes heretofore proposed. As previously noted, in platinum reforming, aromatic hydrocarbons are produced primarily by the dehydrogenation of naphthenes which provides hydrogen gas as a product, the net production thereof amounting to upwards of 1.5 weight percent hydrogen, based on charge stock. In contrast to this, by means of the present invention naphthenes are converted to aromatics without liberation of any appreciable amount of hydrogen, and the hydrogen content of the hydrocarbon product is essentially the same as the naphtha charge stock, i.e., the total net hydrogen product is less than 0.3 weight percent hydrogen. In other words, at equivalent research or motor octane number, the net production of hydrogen obtained by the process of the present invention is less than one-fifth of that obtained by conventional catalytic reforming catalysts, e.g., platinum-alumina. This is illustrated below in Table II wherein various catalysts were employed to reform the above feed stock under the conditions shown.

TABLE II

| | Conditions | | | Products, $C_5^+$ reformate, Vol. percent | | | | |
|---|---|---|---|---|---|---|---|---|
| Example: | Temp., ° F. | LHSV | Charge vol./ cat. vol. | Paraffins | Olefins | Naphthenes | Aromatics | $H_2$ wt., percent |
| 1 | 870 | 4.0 | 8.0 | | | | | 0.23 |
| 2 | 721 | .33 | 2.32 | | | | | |
| 3 | 871 | 4.0 | 8.0 | 55.2 | 1.1 | 8.8 | 35.0 | .16 |
| 4 | 720 | 0.64 | 1.9 | 51.4 | 1.8 | 28.6 | 18.3 | .10 |
| 5 | 721 | 0.70 | 4.2 | 56.3 | 0.4 | 13.6 | 29.7 | .07 |
| 6 | 721 | 0.64 | 1.9 | 56.0 | 0.7 | 11.2 | 32.2 | (¹) |
| 7 | 721 | 0.64 | 1.9 | 53.2 | 1.4 | 18.6 | 26.8 | .01 |
| 8 | 923 | 4.0 | 8.0 | 54.5 | 3.5 | 24.3 | 17.6 | .11 |
| 9 | 720 | 2.0 | 0.67 | 57.4 | 1.0 | 10.3 | 31.3 | .01 |
| 11 | 718 | 1.49 | 0.2 | 55.8 | 0.1 | 15.2 | 28.9 | .01 |
| 12 | 772 | 0.67 | 2.0 | 55.8 | 1.0 | 11.1 | 32.2 | .01 |
| 14 | 920 | 4.0 | 8.0 | 48.9 | 2.1 | 13.0 | 36.0 | .19 |
| 16 | 872 | 4.0 | 8.0 | 53.9 | 2.5 | 18.8 | 24.8 | .09 |
| 17 | 871 | 4.0 | 8.0 | 52.7 | 1.9 | 11.2 | 34.2 | .13 |
| 18 | 876 | 4.0 | 7.9 | 55.2 | 2.0 | 16.3 | 26.7 | .13 |
| 21 | 771 | 0.2 | 1.5 | 56.0 | 0.9 | 9.9 | 33.3 | 0.02 |
| 22 | 722 | 0.33 | 2.0 | | | | | (¹) |

¹ Not detected.

The following data illustrate the effect of hydrogen and hydrogen pressure as a diluent in the reforming of petroleum naphtha. As shown below in Table III, the addition of this diluent hydrogen gas can result in reduced yields of $C_4+$ and $C_5+$ reformates.

TABLE III

| Catalyst | Ex. 6 | Ex. 6 | Ex. 23 |
|---|---|---|---|
| Operating Conditions: | | | |
|   Temperature, ° F. | 721 | 717 | 722 |
|   Pressure, p.s.i.g. | 0 | 0 | 200 |
|   LHSV | .64 | .67 | .65 |
|   Chg./cat., vol./vol. | 1.9 | 2.0 | 2.0 |
|   $H_2$ mol/mol of naphtha | 0 | 2.0 | 2.0 |
| Yield: | | | |
|   $C_3$, vol. percent | 5.3 | 8.5 | 7.9 |
|   $C_4+$ reformate, vol. percent | 102.0 | 100.8 | 99.2 |
|   $C_5+$ reformate, vol. percent | 81.7 | 75.9 | 80.0 |
|   Coke, wt. percent | 2.2 | 2.0 | 2.5 |
|   $H_2$, $C_1$, $C_2$, wt. percent | 0.3 | 0.8 | 0.5 |

Another substantial advantage achieved by the method of the invention resides in the extent and nature of the reformate fraction. In platinum reforming, the $C_4+$ and $C_5+$ reformates generally contain a low volume percent of isoparaffins. By contrast the method of this invention provides highly isoparaffinic reformates which is especially important since the conversion of low-octane number hydrocarbon fuel to high-octane fuel is dependent to a large extent on the formation of branched-chain paraffins from straight-chain paraffins. These results are shown below in Table IV wherein the charge stock employed was that of Table I.

TABLE IV

| Catalyst: | iso-$C_4$, vol. percent of total $C_4$ | iso-$C_5$, vol. percent of total $C_5$ |
|---|---|---|
| Ex. 1 | 67 | 81 |
| Ex. 3 | 71 | 83 |
| Ex. 4 | 76 | 93 |
| Ex. 5 | 75 | 96 |
| Ex. 6 | 76 | 96 |
| Ex. 7 | 75 | 94 |
| Ex. 8 | 62 | 70 |
| Ex. 9 | 75 | 97 |
| Ex. 11 | 73 | 95 |
| Ex. 12 | 72 | 94 |
| Ex. 14 | 69 | 86 |
| Ex. 16 | 65 | 86 |
| Ex. 17 | 71 | 88 |
| Ex. 18 | 66 | 84 |
| Ex. 21 | 73 | 93 |

The above results illustrate the unusual nature and extent of the $C_4$ and $C_5$ reformate fractions obtained in accordance with the method of the invention. As compared to conventional platinum-alumina reforming, the isobutane content of the total $C_4$ fraction is typically about 40 to 50 vol. percent and the isopentane content of the total $C_5$ fraction is typically about 60 to 70 vol. percent. Thus, for example, in an experiment with the same charge stock (Table I) using a commercial platinum-alumina catalyst (0.6 wt. percent Pt) at 500 p.s.i.g. and reforming the $C_5+$ product to 93.6 octane (R+3), the isopentane content amounted to 59.5 vol. percent of the total $C_5$ fraction, and the isobutane content amounted to 49.0 vol. percent of the total $C_4$ fraction.

Table V below further illustrates a striking comparison between conventional platinum reforming and the method of the present invention.

TABLE V

| Catalyst: | Octane of $C_5+$ reformate (R+3) | Yield, vol. percent of $C_4+$ reformate |
|---|---|---|
| Platinum-alumina | 93.6 | 93.5 |
| Ex. 9 | 93.9 | 101.8 |
| Ex. 12 | 92.1 | 102.2 |
| Ex. 22 | 94.8 | 101.2 |

It is to be understood that the above-described embodiments are shown for purposes of illustration only and that other variations can be readily devised by those skilled in the art.

What is claimed is:

1. A method for reforming hydrocarbons with a net increase in aromaticity wherein the hydrogen content of the hydrocarbon product is essentially the same as that of the charge stock and the net production of hydrogen less than about 0.3 weight percent based on the charge stock which comprises contacting a naphtha charge stock having an initial boiling point within the range of about 140° F. to about 350° F. and an end boiling point within the range of about 250° F. to 425° F. at a temperature of about 500° F. to about 1050° F., a liquid hourly space velocity of about 0.05 to about 40, a pressure of about 0.1 to 25 atmospheres with a catalyst composition essentially free of hydrogenation activity comprising a crystalline aluminosilicate base exchanged with cations selected from the group consisting of hydrogen, hydrogen ion precursors, beryllium, magnesium, calcium, strontium, barium, aluminum, scandium, yttrium, rare earth, manganese and mixtures thereof, having a pore diameter greater than about 6 angstrom units and containing less than about 0.25 equivalent of sodium per gram atom of aluminum.

2. The method of claim 1 wherein the crystalline aluminosilicate is admixed with a matrix essentially free of hydrogenation activity in the amount of 2–95% by weight.

3. The method of claim 1 wherein the reaction is carried out essentially at atmospheric pressure.

4. The method of claim 1 wherein the charge stock has an initial boiling point within the range of from about 140° F. to about 350° F. and an end boiling point within the range of from about 250° F. to 425° F.

5. The method of claim 4 wherein the reaction is carried out at essentially atmospheric pressure.

6. The method of claim 4 wherein the crystalline aluminosilicate has a silica-alumina ratio greater than 3.

7. The method of claim 4 wherein the crystalline aluminosilicate is faujasite.

8. The method of claim 6 wherein the aluminosilicate is an acid faujasite formed from a member selected from the group of ammonium and hydrogen faujasites.

9. The method of claim 6 wherein the crystalline aluminosilicate is admixed with a matrix essentially free of hydrogenation activity in the amount of 2–95% by weight.

10. The method of claim 6 wherein the crystalline aluminosilicate contains a rare earth metal cation.

11. The method of claim 6 wherein the crystalline aluminosilicate contains a divalent cation selected from the group consisting of calcium, magnesium and manganese.

12. A method of claim 4 wherein the crystalline aluminosilicate is admixed with a matrix essentially free of hydrogenation activity in the amount of 2–95% by weight.

13. The method of claim 7 wherein the crystalline aluminosilicate has a silica-alumina ratio less than 3.

14. The method of claim 7 wherein the crystalline aluminosilicate is admixed with a matrix essentially free of hydrogenation activity in the amount of 2–59% by weight.

15. The method of claim 7 wherein the faujasite has a silica-alumina ratio greater than 3.

16. The method of claim 15 wherein the aluminosilicate is an acid faujasite formed from a member selected from the group consisting of ammonium and hydrogen faujasites.

17. A method of claim 15 wherein the crystalline aluminosilicate contains a rare earth cation.

18. The method of claim 15 wherein the crystalline aluminosilicate contains a divalent cation selected from the group consisting of calcium, magnesium and manganese.

19. The method of claim 18 wherein the crystalline aluminosilicate contains a rare earth cation.

20. The method of claim 13 wherein the crystalline aluminosilicate contains a rare earth metal cation.

21. The method of claim 13 wherein the crystalline aluminosilicate contains a divalent cation selected from the group consisting of calcium, magnesium and manganese.

22. The method of claim 13 wherein the crystalline aluminosilicate is admixed with a matrix essentially free of hydrogenation activity in the amount of 2–59% by weight.

23. The method of claim 21 wherein the crystalline aluminosilicate contains a rare earth metal cation.

24. The method of claim 25 wherein the crystalline aluminosilicate contains a rare earth cation.

(References on following page)

References Cited

UNITED STATES PATENTS

| | | | |
|---|---|---|---|
| 3,063,934 | 11/1962 | Epperly et al. | 260—683.65 |
| 3,140,253 | 7/1964 | Plank et al. | 208—120 |
| 2,870,083 | 1/1959 | Elliott | 208—138 |
| 2,971,903 | 2/1961 | Kimberlin et al. | 208—135 |
| 2,971,904 | 2/1961 | Gladrow et al. | 208—135 |
| 3,027,413 | 3/1962 | Moy et al. | 208—141 |
| 3,121,754 | 2/1964 | Mattox et al. | 260—683.65 |
| 3,247,099 | 4/1966 | Oleck et al. | 208—138 |
| 3,312,615 | 4/1967 | Cramer et al. | 208—110 |
| 3,324,188 | 6/1967 | Keough | 208—135 |

HERBERT LEVINE, Primary Examiner

U.S. Cl. X.R.

252—455

PO-1050
(5/69)

UNITED STATES PATENT OFFICE
CERTIFICATE OF CORRECTION

Patent No. 3,533,939      Dated October 13, 1970

Inventor(s) Harry L. Coonradt and Winton W. Hamilton

It is certified that error appears in the above-identified patent and that said Letters Patent are hereby corrected as shown below:

Column 4, line 35, that portion of the formula reading "$0.7R_2:0$ to $0.7$" should read --$0.7R_2O:0.3$ to $0.7$--
$\phantom{0.7R_2:0\ }m\phantom{\ \ \ \ \ \ \ \ \ \ \ \ \ \ \ \ \ \ \ \ \ \ \ \ \ \ }m$ Column 5, line 25, that portion of the formula reading "$M_2O(a)$" should read --$M_2O + (a)$--

Column 15, line 7, "gelatin" should be --gelation--
Column 17, line 42, "49.0 vol." should be --49.9 vol.--
Column 17, lines 64-65, "hydrogen less than" should be --hydrogen is less than--
Column 18, line 72, "claim 25" should be --claim 11--

SIGNED AND
SEALED
FEB 9 1971

FEB. 9, 1971

(SEAL)
Attest:

Edward M. Fletcher, Jr.
Attesting Officer

WILLIAM E. SCHUYLER, JR.
Commissioner of Patents